United States Patent [19]
Bernard et al.

[11] Patent Number: 5,513,813
[45] Date of Patent: May 7, 1996

[54] FISHING REEL WITH LINE TENSIONING DEVICE

[75] Inventors: Jean Bernard, Scionzier; Alain Plestan, Marignier, both of France

[73] Assignee: Mitchell Sports, Marignier, France

[21] Appl. No.: 309,922

[22] Filed: Sep. 21, 1994

[30] Foreign Application Priority Data

Sep. 24, 1993 [FR] France .................... 93 11529

[51] Int. Cl.⁶ .................................................. H01K 89/01
[52] U.S. Cl. ......................................................... 242/231
[58] Field of Search ..................... 242/224, 230, 242/231, 232, 233, 319

[56] References Cited

U.S. PATENT DOCUMENTS 2,728,534  12/1955  Wallace ........................ 242/231
2,771,253  11/1956  Mauborgne ................... 242/230
5,312,067   5/1994  Sugawara et al. ............ 242/232

FOREIGN PATENT DOCUMENTS 1936833  6/1970  Germany.
WO85/02974  7/1985  WIPO.

*Primary Examiner*—Joseph J. Hail, III
*Attorney, Agent, or Firm*—Foley & Lardner

[57] ABSTRACT

A fishing reel with a fixed spool and line recovery device comprises a flyer rotated about an axis and carrying a line recovery bail. The bail and the flyer comprise respective pinch surfaces which are pressed together when the bail is in a line recovery position. The fishing line is engaged and pinched between the pinch surfaces and is therefore tensioned between the spool and the recovery device from the start of line recovery. This improves the regularity with which the line is wound around the spool.

10 Claims, 4 Drawing Sheets

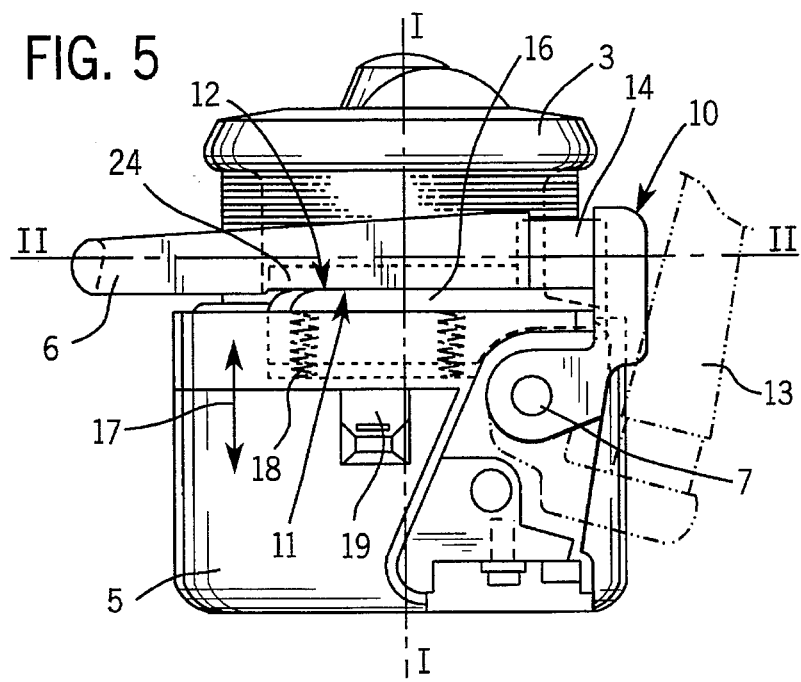
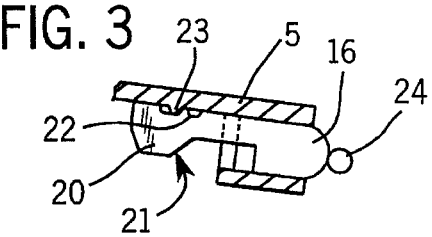
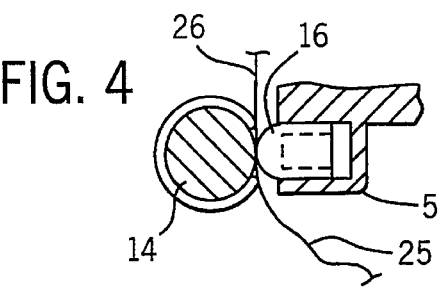
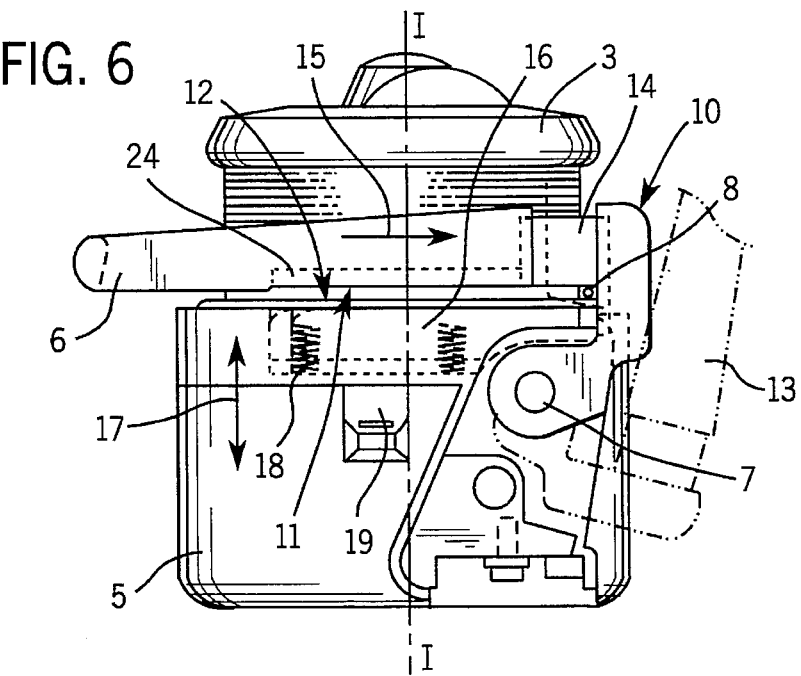

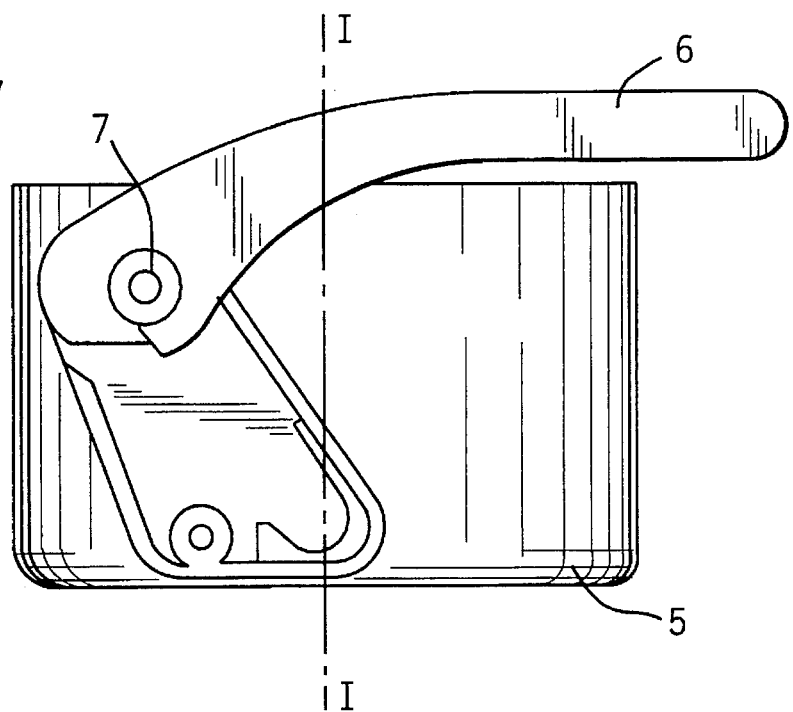
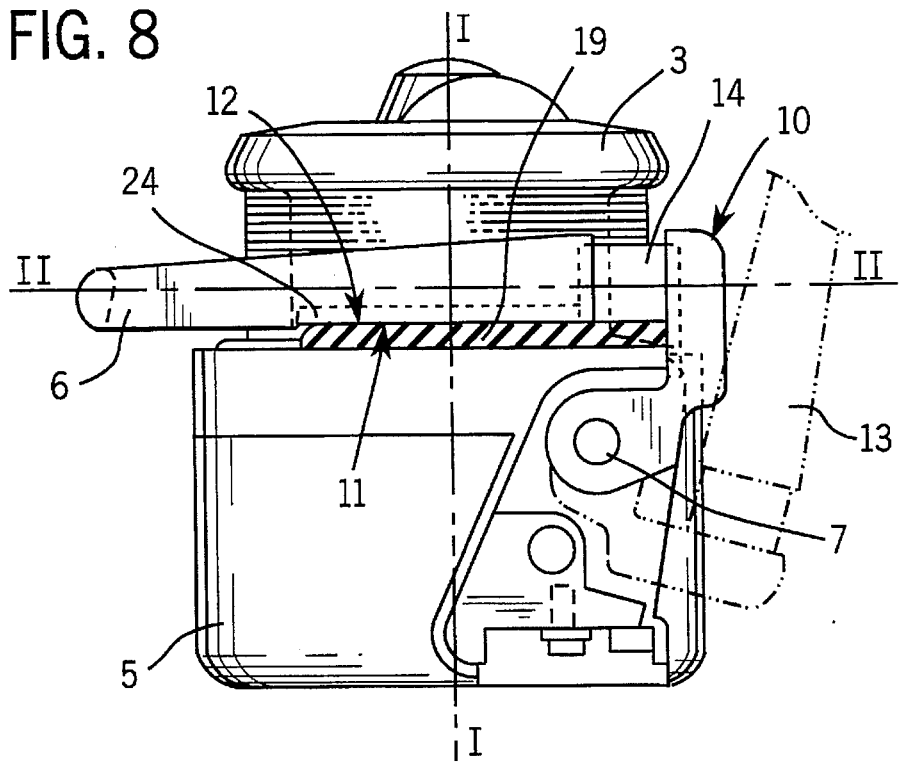

FISHING REEL WITH LINE TENSIONING DEVICE

BACKGROUND OF THE INVENTION

1. Field of the invention

The present invention concerns fishing reels with a fixed spool and a rotary line recovery device in which a flyer rotated about an axis by a crank carries a bail for recovering the line. The bail is retractable and to this end it is articulated to the flyer to pivot between a retracted position releasing the fishing line to allow it to be unwound out of the spool and a recovery position around the spool to recover and guide the line and to wind it onto the spool as the flyer rotates.

2. Description of the Prior Art

For casting, the line is initially wound onto the spool. The angler pivots the bail into the retracted position to make the cast, during which the line is unwound rapidly out of the spool. At the end of the cast the line is slack. To recover it the angler turns the reel crank which rotates the flyer about its axis. On standard reels this rotation automatically pivots the bail which moves to the recovery position to guide the line and to wind it onto the spool. At the start of line recovery the line is usually on an intermediate part of the bail and is progressively engaged around a first end of the bail.

From the introduction of this type of fishing reel problems have been experienced with winding of the line onto the spool at the start of recovery. If the line is very slack at the start of recovery the part of it between the spool and the bail is itself slack, with the result that the first turns wound onto the spool are often very loose and produce irregular winding. These winding irregularities can also occur during recovery if the tension in the fishing line varies. At some stages of line recovery the line may be completely slack.

These winding irregularities interfere with subsequent casting as they favor the simultaneous releasing of more than one turn from the spool, often causing tangling of the line (anglers call the resulting tangle a "hairpiece").

The problem to which the present invention is addressed is that of designing a new fishing reel structure with a line recovery bail which can wind the fishing line regularly onto the spool from the start of recovery and throughout recovery, even if the fishing line is slack.

In accordance with the invention, a regular and constant tension is produced in the portion of line to be wound around the spool, regardless of the diameter of the fishing line.

SUMMARY OF THE INVENTION

To achieve these and other objects, near the first end of the bail for guiding the line the bail and the flyer comprise respective pinch surfaces which are shaped so that they are pressed together when the bail is in the recovery position. Accordingly, when the flyer is rotated to recover the line the latter is engaged and pinched between the pinch surfaces and is therefore tensioned between the spool and the bail. The tension depends mainly on the force with which the line is pinched between the pinch surfaces and is therefore virtually independent of the tension (or absence of tension) in the downstream portion of the line, i.e. the portion of the line on the downstream side of the recovery device.

In this structure of the invention both pinch surfaces turn with the flyer with the result that there is no friction between the flyer and the spool. Rotation of the flyer is not disturbed and only the line is subjected to friction forces, which tension it.

The bail preferably comprises at its first end a line guide roller adjacent the pinch surface of the bail and facing the end portion of the pinch surface of the flyer. In this way, if the downstream part of the line, on the downstream side of the recovery device, is under tension, the line tends to slide laterally between the pinch surfaces until it is engaged between the guide roller and the pinch surface of the flyer.

By giving the respective pinch surfaces a substantial length, for example a length between one tenth of the length of the bail and the full length of the bail, the line is tensioned from the very start of recovery, as soon as it is engaged between the ends of the respective pinch surfaces.

In an advantageous embodiment of the invention the flyer pinch surface is formed by the outside surface of a mobile skid mounted on the flyer so that it is free to move to the front and to the rear and which is springloaded by spring means towards the front in the direction of the bail.

Other objects, features and advantages of the present invention emerge from the following description of specific embodiments of the invention given with reference to the appended drawings.

BRIEF DESCRIPTION OF THE DRAWINGS

FIG. 3 is a partial cross-section view of a recovery device flyer cut along line 3—3 in FIG. 2.

FIG. 4 is a partial cross-section view of the reel cut along line 4—4 in FIG. 2.

FIG. 5 is a partial side view of the fishing reel of the invention in a line recovery position without the line pinched.

FIG. 6 is a partial side view of the fishing reel from FIG. 5 in the line recovery position with the line pinched.

FIG. 7 is a partial view of the opposite side of position.

FIG. 8 is a partial side view of the fishing reel of the invention in the line recovery position with the pinch surface formed by an elastically deformable material shown in cross-section.

DETAILED DESCRIPTION OF THE PREFERRED EMBODIMENT

Figure 1:
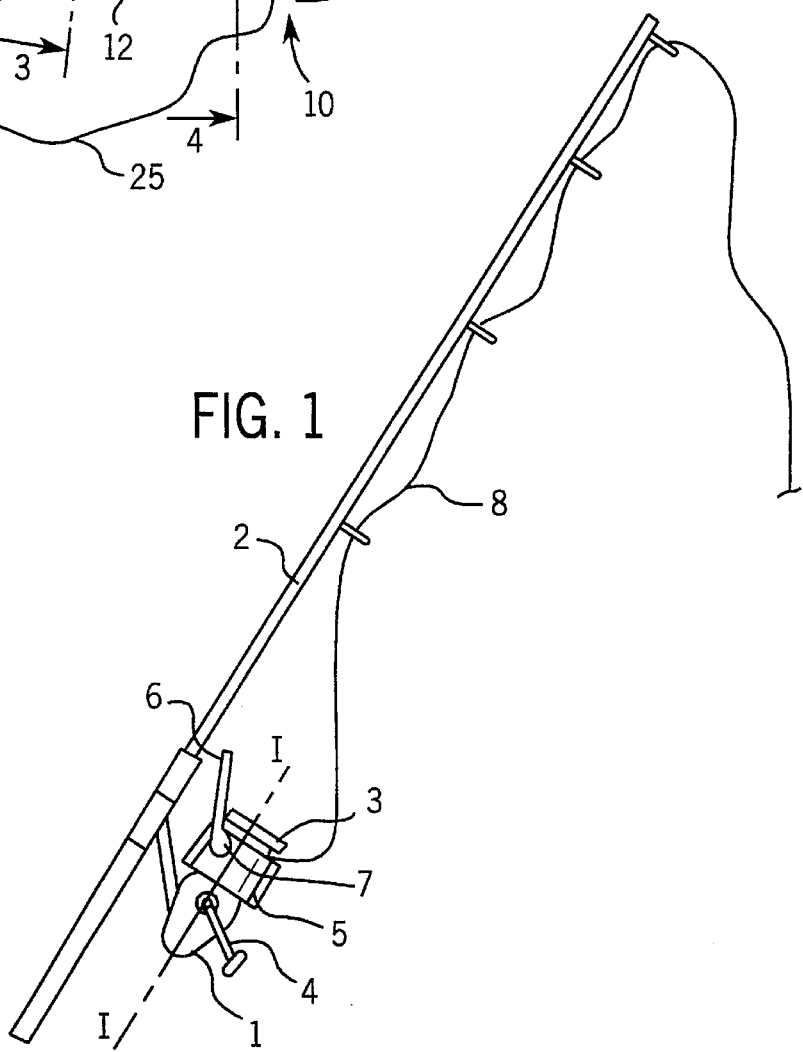
FIG. 1 is a side view of a fishing rod with a fishing reel and the fishing line slack, as at the end of a cast.

Referring to FIG. 1, standard fishing reels for casting comprise a reel body 1 with means for fixing it to a fishing rod 2. The reel body 1 carries a spool 3 whose longitudinal axis of symmetry I—I is substantially parallel to the lengthwise direction of the fishing rod 2. Line recovery means comprise a crank 4 to be turned by the angler to rotate a flyer 5 rotating about the axis I—I of the spool 3 through a transmission mechanism inside the reel body 1. The flyer 5 carries a retractable line recovery device bail 6 which is articulated to the flyer 5 about a transverse rotation axis 7 to pivot between a retracted position (shown in FIG. 1) releasing the fishing line 8 to enable it to be unwound out of the spool 3 and a recovery position (shown in the other figures) in which the bail 6 surrounds the spool 3 to recover and guide the line 8 and to wind it onto the spool 3 when the flyer 5 is rotated.

As shown in FIG. 1, the line is slack after casting.

Figure 2:
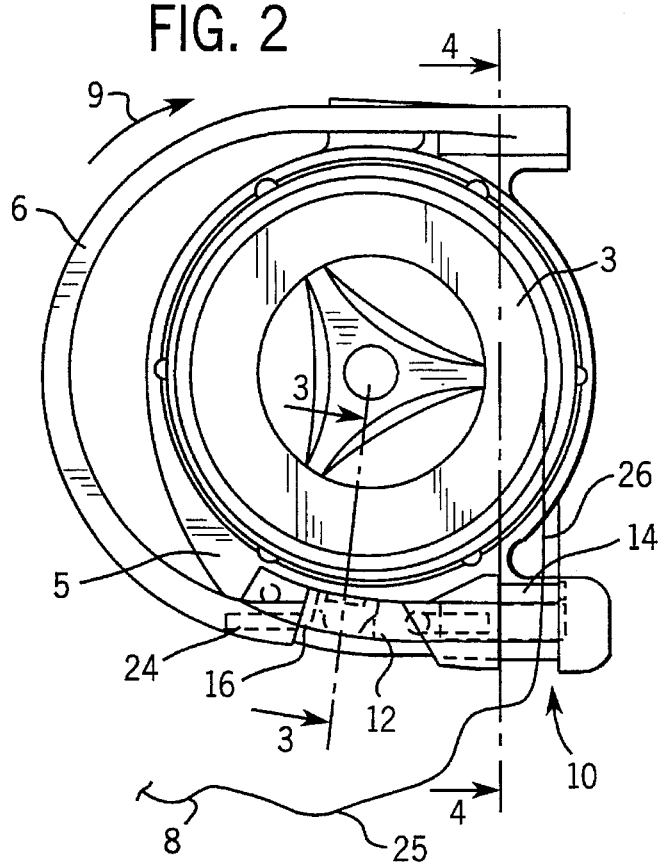
FIG. 2 is a view in cross-section of a fishing reel of the invention in the line recovery position.

Referring to FIG. 2, during line recovery operating the crank 4 rotates the flyer 5 about the spool 3 in the direction shown by the arrow 9. As a result the fishing line 8 is progressively engaged around the first end 10 of the bail 6, which is the rear end in terms of the direction of rotation 9 of the flyer 5.

As shown in FIGS. 5 and 6, near said first end 10 of the bail 6, the bail 6 and the flyer 5 have respective pinch surfaces 11 and 12. The pinch surfaces 11 and 12 are shaped to be pressed together when the bail 6 is in the recovery position as shown in full line in FIGS. 5 and 6. FIGS. 5 and 6 show in chain-dotted line a part 13 of the bail 6 in its retracted position.

In the embodiment shown in the figures, the bail 6 has at its first end 10 a guide roller 14 for guiding the line 8. The guide roller 14 is adjacent the pinch surface 11 of the bail 6 and faces the end portion of the pinch surface 12 of the flyer 5. Accordingly, if the downstream part of the line, i.e. the part of the line on the downstream side of the recovery device, is under tension the line 8 tends to slide laterally between the pinch surfaces 11 and 12, as shown by the arrow 15 in FIG. 6, until it engages between the guide roller 14 and the pinch surface 12 of the flyer 5. The roller 14 rotates about an axis II—II shown in FIG. 5 which, in the line recovery position, is substantially perpendicular to the axis I—I of the spool.

When the bail 6 is in the recovery position the respective pinch surfaces 11 and 12 are preferably disposed face-to-face over a substantial distance, for example a distance between one tenth of the length of the bail 6 and the full length thereof. The embodiment shown in the figures, which achieves good results, comprises pinch surfaces 11 and 12 occupying a distance between one third and one quarter the length of the bail 6.

Equally, when the bail 6 is in the recovery position the respective pinch surfaces 11 and 12 can be slightly inclined to each other so that they converge wedge-fashion towards the first end 10 of the bail 6. This facilitates the progressive engagement of the line at the start of recovery.

In a simplified embodiment of the invention at least one of the pinch surfaces 11 and 12 is made from an elastically deformable material. This embodiment is advantageous when the bail 6 is fixed in its recovery position by locking means: the elastically deformable material 19 thus procures elastic pinching of the line, ensuring a given regular tension in the line regardless of its diameter.

If the bail 6 is held in the recovery position by spring means, it is not essential to use an elastically deformable material for at least one of the pinch surfaces 11 and 12.

In the embodiment shown in the figures the pinch surface 12 of the flyer 5 is formed by the outside surface of a mobile skid 16 mounted on the flyer 5 so that it is free to move to the front and to the rear as shown by the double-headed arrow 17. The mobile skid 16 is spring-loaded by spring means 18 such as helical springs which push it towards the front in the direction of the bail 6. FIG. 5 shows the mobile skid 16 in the pinch position, pressing against the bail 6. FIG. 6 shows the mobile skid 16 partially retracted, pushed towards the rear by the line 8 engaged between the bail 6 and the skid 16.

The mobile skid 16 can advantageously be retractable. To this end it is associated with locking means 19 for holding it back, away from the bail 6, so that pinching of the line 8 can be selectively disabled. FIG. 3 shows one example of locking means, being a view in cross-section of the part of the flyer 5 in which the skid 16 slides. The posterior portion of the skid 16 comprises a tang 20 whose outside surface 21 is accessible to the angler for moving the skid between its locked and unlocked positions. The inside part of the tang comprises notches 22 which engage a boss 23 projecting from the guide surface of the flyer 5. By engagement with the boss 23 the skid 16 is retained in either its locked or its unlocked position. In the locked position the skid bears against the bail 6 as shown in FIG. 5. In the unlocked position the skid is fully retracted as shown in FIG. 6.

Figure 9:
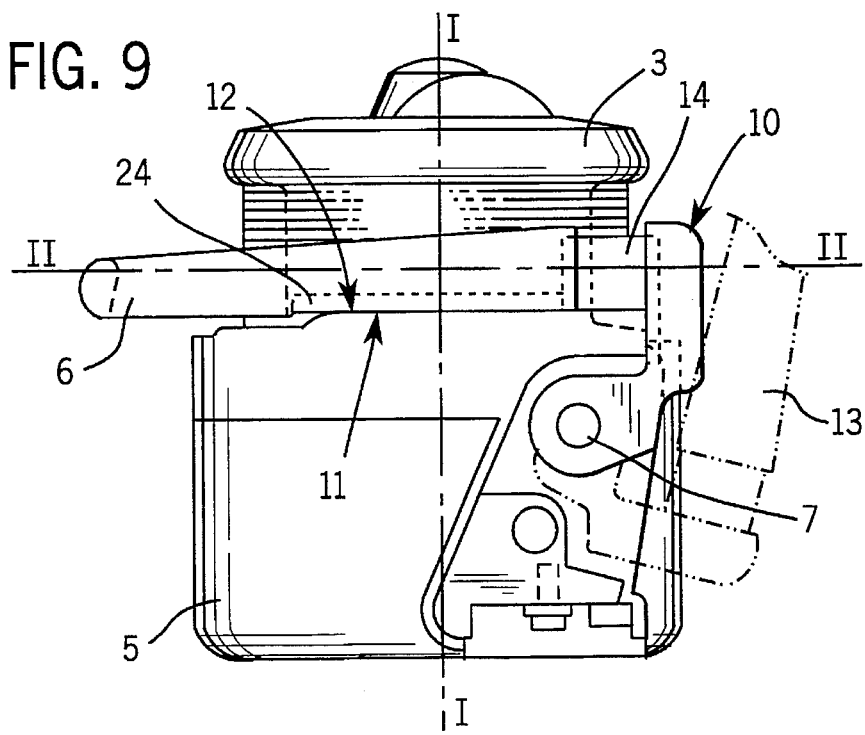
FIG. 9 is a partial side view of the fishing reel of the invention in the line recovery position with the pinch surface formed by a front face of the flyer.

In the embodiment shown in FIG. 9 the pinch surface 12 of the flyer 5 is the front surface of the flyer itself. This embodiment is suitable for reels in which the flyer covers the spool 3, known as enclosing flyer reels.

Figure 10:
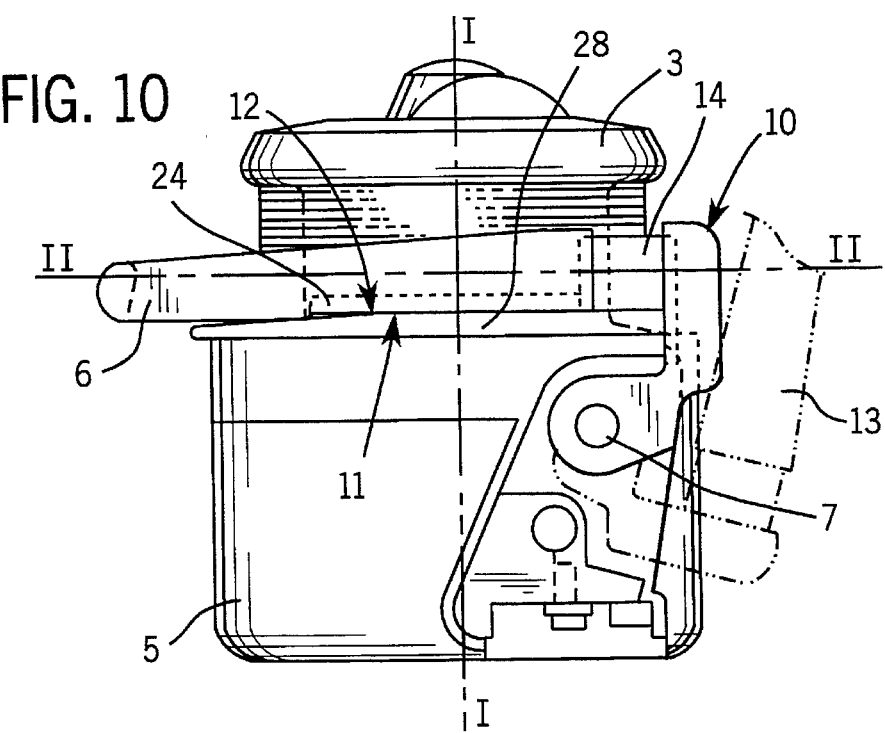
FIG. 10 is a partial side view of the fishing reel of the invention in the line recovery position with the pinch surface formed by an auxiliary bail arm.

In enclosing spool reels it is possible to provide an auxiliary bail 28 fixed to the flyer 5 to the front of its anterior edge and generally parallel to the line recovery device bail 6. As shown in FIG. 10, the pinch surface 12 is then the 28 front surface of this auxiliary bail.

This reel structure is compatible with making the bail 6 from a composite material. In this case, to prevent wear of the composite material by rubbing of the pinched line 8, an anti-wear metal part 24 can advantageously be incorporated into the composite material bail 6. The pinch surface 11 of the bail is then the posterior surface of this anti-wear metal part 24.

FIGS. 2 and 4 show the effect of the pinch means of the invention: the downstream portion 25 of the fishing line 8, i.e. the portion on the downstream side of the line recovery device, may be slack but the upstream portion 26 of the fishing line, i.e. the portion between the bail 6 and the spool 3, is tensioned with a tension determined by the force with which the line is pinched between the pinch surfaces 11 and 12.

The present invention is not limited to the embodiments which have been explicitly described but encompasses various variants and generalizations thereof within the scope of the following claims.

There is claimed:

1. Fishing reel with fixed spool and rotary line recovery device wherein a rotary flyer rotated about an axis by a crank carries a line recovery bail articulated to the flyer to pivot between a retracted position releasing the fishing line to enable it to be unwound out of said spool and a recovery position around said spool to recover and guide said line and to wind it onto said spool as said flyer rotates, said line being progressively engaged around a first end of said bail, in which reel: near said first end of said bail a said bail and said flyer comprise respective pinch surfaces shaped to be pressed together when said bail is in a recovery position so that on rotation of said flyer to recover said line the latter is engaged and pinched between said pinch surfaces and is therefore tensioned between said spool and said recovery device.

2. Reel according to claim 1 wherein when said bail is in its recovery position said pinch surfaces face each other over a distance between one tenth of the length of said bail and the full length thereof.

3. Reel according to claim 1 wherein at its first end said bail comprises a line guide roller adjacent said pinch surface of said bail and facing an end portion of said pinch surface of said flyer so that if a downstream part of said line on a downstream side of said recovery device is under tension said line tends to slide laterally between said pinch surfaces until it engages between said guide roller and said pinch surface of said flyer.

4. Reel according to claim 1 wherein said pinch surfaces are slightly inclined relative to each other so that they converge wedge-fashion towards said first end of said bail.

5. Reel according to claim 1 wherein at least one of said pinch surfaces is made from an elastically deformable material.

6. Reel according to claim 1 wherein said pinch surface of said flyer is the outside surface of a mobile skid mounted on said flyer, free to move towards the front and towards the rear and spring-loaded by spring means towards the front in the direction of said bail.

7. Reel according to claim 6 wherein said skid is retractable and associated with locking means for holding it back away from said bail to disable selectively pinching of said line.

8. Reel according to claim 1 wherein said pinch surface of said flyer is a front surface of said flyer itself.

9. Reel according to claim 1 wherein said pinch surface of said flyer is a front surface of an auxiliary bail fixed to said flyer and generally parallel to said recovery device bail.

10. Reel according to claim 1 wherein said recovery device bail is made from a composite material having an anti-wear metal part with a posterior surface which forms said pinch surface of said bail.

* * * * *